United States Patent [19]
Derby et al.

[11] Patent Number: 5,425,021
[45] Date of Patent: Jun. 13, 1995

[54] PACKET SWITCHING RESOURCE MANAGEMENT WITHIN NODES

[75] Inventors: Jeffrey H. Derby, Chapel Hill; John E. Drake, Jr., Pittsboro; John G. Dudley, Raleigh, all of N.C.; Roch Guerin, Yorktown Heights; Marc A. Kaplan, Katonah, both of N.Y.; Gerald A. Marin, Chapel Hill; Marcia L. Peters, Pittsboro, both of N.C.; Kenneth H. Potter, Jr., Raleigh, N.C.

[73] Assignee: International Business Machines Corporation, Armonk, N.Y.

[21] Appl. No.: 10,136

[22] Filed: Jan. 28, 1993

[51] Int. Cl.$^6$ .......................... H04J 3/24; H04Q 11/04; H04L 12/56
[52] U.S. Cl. ........................... 370/54; 370/60; 370/94.1; 370/94.3; 340/825.02; 340/826
[58] Field of Search ............... 370/16, 54, 60, 85.13, 370/85.14, 94.1, 94.3; 340/825.02, 825.5, 825.51, 825.52, 826, 827

[56] References Cited

U.S. PATENT DOCUMENTS

| 4,644,532 | 2/1987 | George et al. | 370/94.3 |
| 4,679,189 | 7/1987 | Olson et al. | 370/60 |
| 4,740,954 | 4/1988 | Cotton et al. | 370/60 |
| 4,864,559 | 9/1989 | Perlman | 370/94.3 |
| 4,939,726 | 7/1990 | Flammer et al. | 370/94.1 |
| 5,150,360 | 9/1992 | Perlman et al. | 370/94.3 |

*Primary Examiner*—Alpus Hsu
*Attorney, Agent, or Firm*—Steven B. Phillips

[57] ABSTRACT

Method and apparatus for making limited internal-node communication facilities externally visible in a packet switching network. Internal-node communication facilities are called intranode links, can include any cable, channel, bus, etc. over which data passes, and are used to connect the multiple subnodes within a given node. Each subnode contains a switching mechanism and routes packets to other nodes, subnodes, or user applications. Each node provides network control functions such as topology, directory, path selection, and bandwidth management which can manage intranode links in the same manner that internode links are currently managed.

3 Claims, 5 Drawing Sheets

PACKET SWITCHING RESOURCE MANAGEMENT WITHIN NODES

This invention relates to a method and apparatus for the packet switching of information signals. More specifically, this invention relates to an architecture which incorporates multiple subnodes, each containing a switching fabric, within nodes as a subsidiary part thereof. The subnodes within a given node are connected with bandwidth-limited, internal-node communication facilities called intranode links which are managed in the same manner that internode transmission links are managed using current techniques.

DESCRIPTION OF THE PRIOR ART

In high speed transmission networks, routing of packets through the network is accomplished by means of routing information in-the packet header. Such a network is composed of nodes interconnected by transmission links. Each node includes a packet switching mechanism for selectively launching received packets on outgoing transmission links and provide access to the network for user applications and network control functions. For example, a prior art node will include a multiplicity of adapters—circuits attached to a single bus. The adapters examine the headers of packets on the bus to determine which packets are destined for which adapters. Such networks can be characterized as nodes, user applications in nodes, a switch per node, and the links connecting them together. Links connecting switches together correspond to the transmission links interconnecting such switching mechanisms. Adapter circuits at each of the switching mechanisms adapt the packet signals for transmission on or delivery to the transmission links and user applications. Many different types of packet switching mechanisms and transmission links can be accommodated in such packet transmission systems.

Routing information for such networks can be expressed in many different forms, two major modes of which are called Automatic Network Routing (ANR), used to deliver a packet to a single destination endpoint, and Tree Multicast Mode (TMM), used to deliver a single packet to a plurality of destination endpoints. In ANR, the successive links in the path are specified, in routing order, by ANR labels in a packer's routing field. Along the path, as the packet is switched to a new link, that link's label is stripped away from the routing field to leave the next-to-be-used link label as the first label in the routing field. Automatic Network Routing is described in "PARIS: An Approach to Integrated High-Speed Networks" by I. Cidon and I. S. Gopal, *International Journal of Digital and Analog Cabled Systems,* Vol. 1, No. 2, April-June, 1988, pages 77-85.

In TMM routing, multicast trees are predefined to connect a desired set of user applications (end users) to the packet transmission network. A tree is defined as a connected set of user applications, switches and links having no cycles or loops. The term "multicast" is defined, as a single sending user application transmitting packets to a multiplicity of receiving user applications. The multicast tree is identified in the routing field by a tree address. This tree address is used at each switching point in the tree to route the packet to all other connected switches or user applications of the same tree (except the switch or user application from which the packet was received). In this way, any user application of a multicast tree can launch a packet with the tree address in the routing field and have the packet delivered to all of the other user applications of the same multicast tree. Such multicast tree routing is described in "Distributed Control for PARIS," by B. Awerbuch, I. Cidon, I. Gopal, M. Kaplan, and S. Kutten, *Proceedings of the 9th ACM Symposium on Principles of Distributed Computing,* Quebec, Canada, August, 1990, pages 145-159.

Associated with networks are several network control functions: network spanning tree maintenance, topology database, directory, path selection, bandwidth management and reservation, and congestion control. Preferably, every node has a set of the foregoing network control functions called its control point (CP) that the node uses to facilitate the establishment of connections between user applications.

A spanning tree comprises a group of transmission links connecting the CPs in all nodes of the network. Spanning tree maintenance is a network control function that establishes and maintains a multicast tree for use as a distribution mechanism for all CPs of the network. The spanning tree allows efficient distribution of network control packets by taking advantage of underlying hardware and communication medium facilities. Each link in the spanning tree is programmed to accept packets marked with the associated architecturally-defined tree address, and its entry in the topology database (described below) is flagged as a spanning tree edge.

The spanning tree allows the CP in one node to send packets to the CPs in all other nodes of the network. A CP can also send packets directly to the CP in an adjacent node. When a transmission link between two nodes is activated, information is exchanged across the link; this information includes the ANR labels associated with the CPs in the two nodes. Thus, each CP can direct a packet across the newly-activated transmission link to the CP in its adjacent node. Spanning trees are further described in "Distributed Tree Maintenance", IBM Technical Disclosure Bulletin, Vol. 35, No. 1A, June, 1992, pp. 93 to 98, and also in U.S. Pat. No. 4,864,559 to Perlman, Sep. 5, 1989.

The topology function dynamically maintains information about the nodes and transmission links of the network in a database. The topology database includes link information required for path selection such as the bandwidth capacity and the total bandwidth currently allocated for ongoing connections. This database is replicated in each node; each node regularly distributes topology update information about itself and its links so that all nodes maintain a consistent view of the topology of the overall network.

The directory function retrieves and maintains information about the user applications available in the various nodes of the network. More specifically, the directory function allows one user application to discover the network address of another user application with which it wishes to communicate. A node has a unique identifier within its network. The network address of a user application can be specified as the combination of its node identifier and its ANR label within the node. The network address of a group of user applications connected to a multicast tree can be specified with a combination of the tree address and the identifier of one node in the tree.

The path selection function selects the links for point-to-point paths and multicast trees to be used for data traffic between user applications or for network control. The goals of path selection are to maximize network throughput and to meet user service requirements such as access delay. Path selection requires information from both the topology and directory functions in order to select a usable path.

Once the path for a connection is selected, the bandwidth management and reservation function allocates bandwidth on the links of the path. This function is also responsible for maintenance and deallocation of the reserved bandwidth.

Once bandwidth is allocated to a connection, the congestion control function ensures that the traffic for that connection entering the network stays within the allocated bandwidth. Congestion control allows the connection source to transmit packets at the long-term average rate allocated and controls the burstiness of the source. Bandwidth capacity and allocation information for the links of the connection's path are taken into account in the setting of the parameters of the congestion control mechanism. Bandwidth management and reservation and congestion control are described in "Bandwidth Management and Congestion Control in plaNET" by I. Cidon, I. Gopal, and R. Guerin, *IEEE Communications Magazine*, October, 1991, pages 54–64.

It would be advantageous to include a multiplicity of switching mechanisms, i.e. subnodes, within a node. One reason is that the switching mechanism, typically the bus into which adapters are inserted, becomes increasingly congested as more adapters are accommodated. However, by simply adding more switching mechanisms to a node, problems arise in the congestion control of the network as a whole. These problems are due to the fact that connections within the network are assigned without knowledge of the capacity and congestion between the switching mechanisms within each of the system nodes. Over time, intranode congestion increases to the point where packets are lost.

It is possible to avoid these problems by including a Control Point function for each switching mechanism. However, this is an expensive solution and is equivalent to the present prior art.

SUMMARY OF THE INVENTION

It is an object of this invention to provide subnodes within the nodes of a packet switching network.

It is another object of this invention to make other nodes of a given network aware of the intranode links connecting subnodes and of the bandwidth limitations of these intranode links.

It is a further object of this invention to allow flexibility in the association of the control point (a collection of network control functions) with a particular subnode within a node. All network control functions may be performed by circuits and processes in a single subnode; some network control functions may be performed in one subnode and some in another subnode; and the assignment of which network control functions are to be performed by which subnode can be made dynamically and changed over time.

The present invention relates to method and apparatus that allow network control functions resident in the nodes, such as topology, directory, path selection, and bandwidth management and reservation to be aware of, and to manage, bandwidth-limited, internal-node communication facilities connecting multiple switching mechanisms.

This invention covers method and apparatus for making limited internal-node communication facilities externally visible via the topology database by creating subnodes connected with intranode links as subsidiary parts of a node. The subnode contains a switching mechanism and its associated adapters within the node; such a switching mechanism has sufficient bandwidth capacity to meet the demand of all the connections it supports without becoming a "bottleneck" for network throughput. The intranode link, on the other hand, represents a bandwidth-limited communication facility, such as a cable, channel, or bus, connecting two switching mechanisms.

As with transmission links between nodes, the bandwidth available on intranode links is finite. Therefore, it is advantageous to perform bandwidth reservation and maintenance for intranode links, and to consider them in the path selection and congestion control processes. Thus, intranode links within nodes provide a function similar to that provided by transmission links between nodes, and it is desirable to manage links between subnodes in the same manner as links between nodes. In addition, this invention allows a single set of network control functions to be sufficient for a node with multiple subnodes.

DETAILED DESCRIPTION OF THE INVENTION

Currently only information about nodes and the transmission links between nodes is communicated in topology updates and maintained in topology databases. In order for intranode links to be managed by the network control functions in other nodes, intranode links and subnodes must be represented in the topology database of each node in the network.

According to this invention, the physical configuration of the node consists of the following hierarchy: node, subnode, link. By definition a node is an entity that possesses one complete set of network control functions. It has a unique identifier within the network (NetID.node ID) and certain characteristics such as the ability to provide directory and path selection services. A subnode is a subsidiary entity of the node; it is uniquely identified by the combination of its node and subnode identifiers (NetID.node ID.subnode ID); it also has the ability to manage its outgoing links. An internode link connects a subnode of one node to a subnode of another node. An intranode link connects two subnodes of the same node. A link (internode or intranode) is identified by the subnodes it interconnects and an ANR routing label assigned to represent the link in each of these subnodes (i.e., NetID.node ID.subnode ID, routing label, NetID.node ID.subnode. ID, routing label). Each ANR label assigned by a subnode is unique within that subnode.

Figure 1:
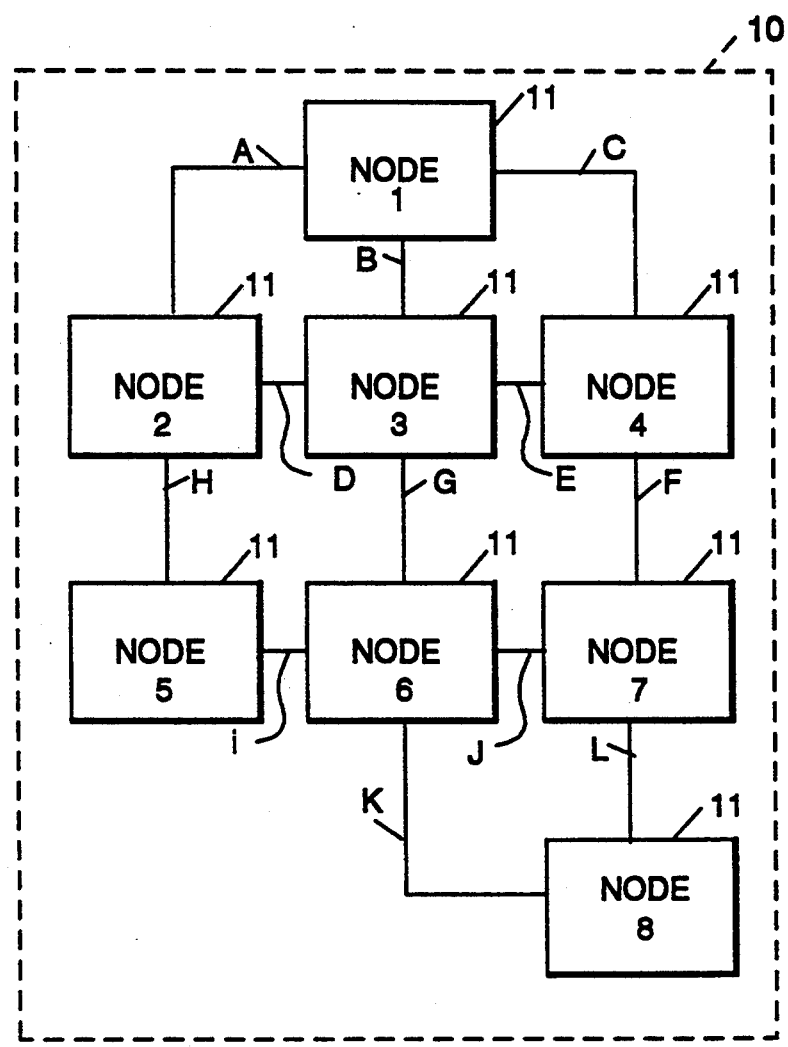
FIG. 1 shows a general block diagram of a packet communications system in which the present invention would find use.
Figure 2:
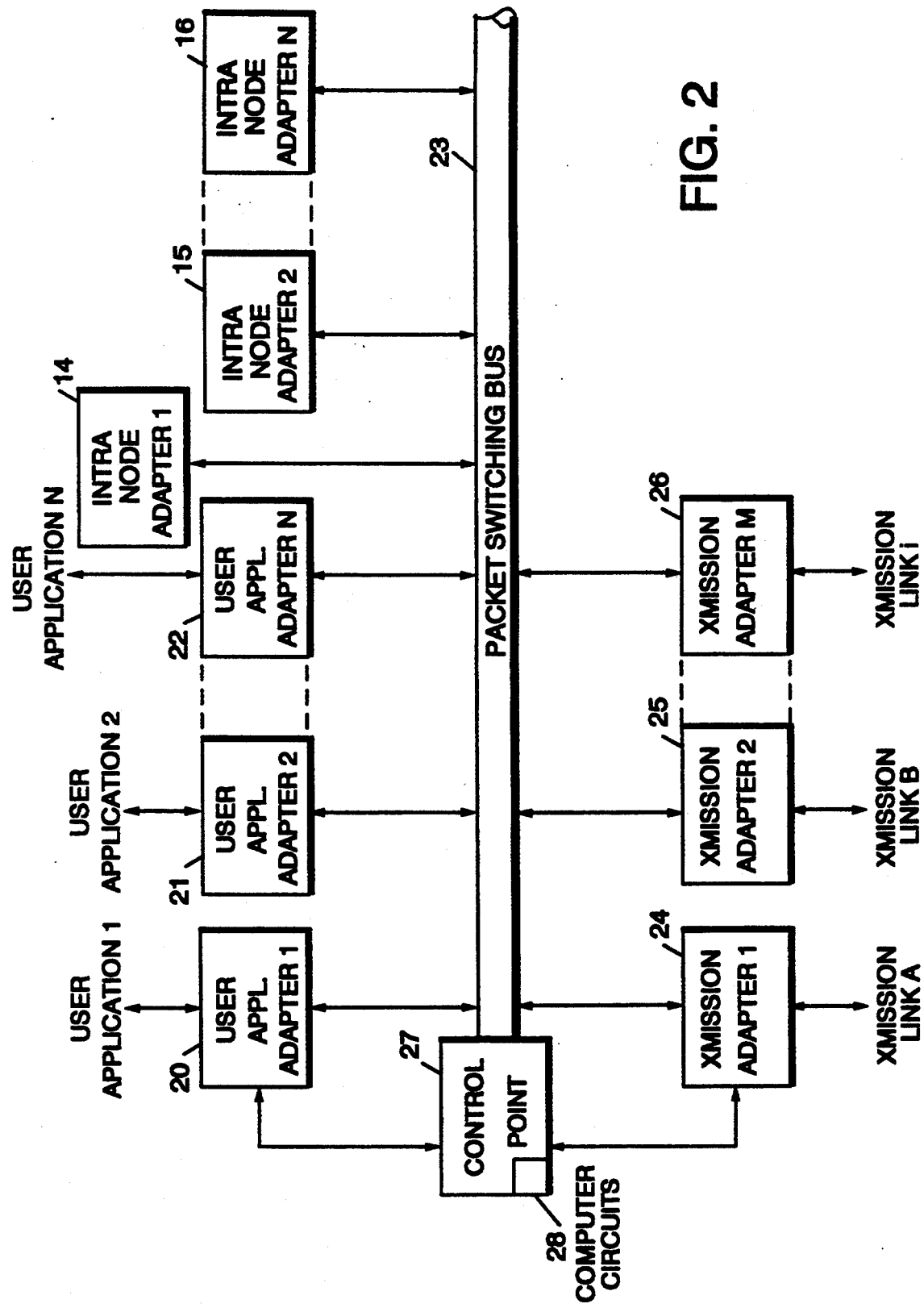
FIG. 2 shows a general block diagram of a typical packet network subnode with a control point; such a subnode may be found in one of the nodes of the system of FIG. 1.

In FIG. 1 there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Each of network nodes 11 comprises a data processing system which provides data communications services to all connected nodes. Each of the network nodes 11 includes one or more subnodes, each corresponding to a switching mechanism within the node at which incoming data packets may be selectively routed on one or more of the outgoing links terminated in another subnode. Each of the network nodes 11 may contain or be connected to one or more user applications. Such routing decisions are made in each subnode in response to information in the header of the data packet, to be described more fully hereinafter. In addition to the basic packet routing functions the network nodes 11 also provide ancillary services such as calculating routing paths for packets originated in the node, directory services, and maintenance of network topology databases which are used to support the routing calculations. In FIG. 2 there is shown a general block diagram of a typical subnode such as is found in the network nodes 11 of FIG. 1. The subnode of FIG. 2 comprises a high speed packet switching bus 23 onto which packets arriving at the subnode are entered. Such packets arrive from external nodes over links via transmission adapters 24, 25, ..., 26, or originate in internal node user applications via application adapters 20, 21, ..., 22, or arrive from other subnodes within the node via intranode adapters 14, 15 ... 16. Packets might also be placed on the bus by network control function adapters. All adapters in a subnode examine packet headers of packets on bus 23. Using information in the packet header, each of the adapters 20-22, 24-26, and 14-16 determine which packets placed on bus 23 have its address and are to be routed to its user application or link, as the case may be, attached to the adapter. The adapters 20-22, 24-26, and 14-16 may include queuing circuits for queuing packets prior to or subsequent to switching on bus 23. The control point 27 calculates optimum routes through the network of FIG. 1 so as to minimize the amount of network resources used to complete a communication path. The control point 27 of FIG. 2 may comprise discrete digital circuitry or may preferably comprise properly programmed digital computer circuits 28. Such a programmed computer can be used to generate headers for packets originating at user applications in the node of which the subnode of FIG. 2 is a part. Finally, the databases necessary to support the calculation Of optimum routes for packets originating at the node are also included in the control point. Such network topology databases include all the necessary information about the nodes, subnodes, and intranode links and transmission links connected to the subnodes which are to be used for routing. Moreover, such topology information is updated when new links are activated or new nodes or subnodes are added to the network. Such network topology information is exchanged with all other nodes to provide the necessary up-to-date information needed for route calculation. Such database updates are carried on packets very similar to the data packets between user applications of the network.

In one embodiment of this invention, the control point functions are all contained within a single subnode of a node. In another embodiment, the control point functions are distributed among the several subnodes of a node. In any case, each node can perform all control point functions. A single network can contain nodes exhibiting both embodiments. The packet network of FIG. 1 thus operates to enable communication between any two user applications located in the network nodes 11 of FIG. 1 without dedicating any transmission or node facilities to that communication path except for the duration of a single packet. In this way, the utilization of the communication facilities of the packet network is optimized to carry significantly more traffic than would be possible with dedicated transmission links for each communication path.

Figure 3:
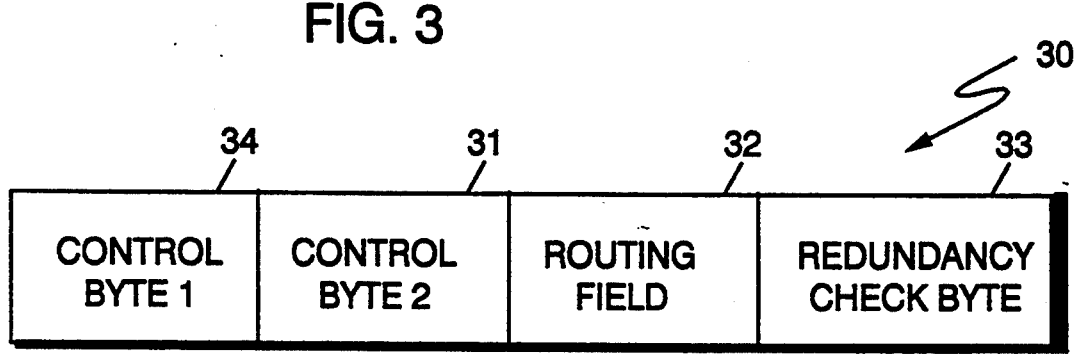
FIG. 3 shows a graphical representation of a typical header for the packet transmitted on the system of FIG. 1.

As previously noted, FIG. 3 shows a graphical representation of the network layer header for packets transmitted on the packet network of FIG. 1. The network layer provides the services necessary to route packets across the packet network by directing the packets from subnode to subnode using appropriate transmission and intranode links. In addition, the network layer may discard packets if errors occur in the packet header or if a buffer overflows.

The header of FIG. 3 comprises four different fields, including control bytes 34 and 31, routing field 32, and redundancy check byte 33. Control byte 34 includes binary bits used to encode the routing mode and the loss and delay properties. As previously noted, these modes include an Automatic Network Routing (ANR) mode and a Tree Multicast Mode (TMM). Other mode codes are possible, but are of no interest to the present invention and will not be further discussed here.

The second control byte 31 of the header of FIG. 3 is used to encode packet copy identification modes, end-to-end transport connection control, and a generic extension code. None of these codes are of interest in connection with the present invention and will not be further discussed here.

Returning to FIG. 3, the redundancy check byte 33 is a check sum for the network layer header of FIG. 3 and is used to check for errors in the header itself. If an error is detected in the header, the packet is discarded. The routing field 32 of FIG. 3 can take on several different formats, depending on the routing mode specified in control byte 34. Two of these routing field formats are shown in FIGS. 4 and 5, corresponding to the Automatic Network Routing (ANR) mode (FIG. 4), and the Tree Multicast Mode routing (TMM) mode (FIG. 5).

Figure 4:
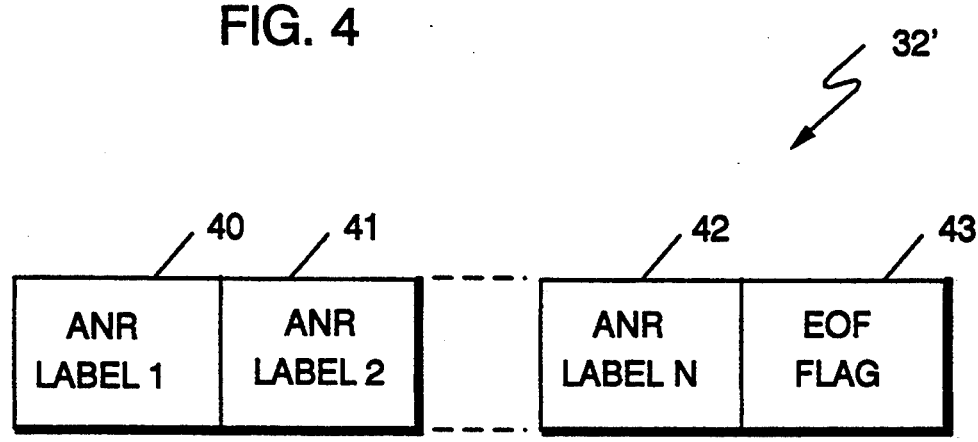
FIG. 4 shows a graphical representation of an Automatic Network Routing field in the header of FIG. 3.
Figure 5:
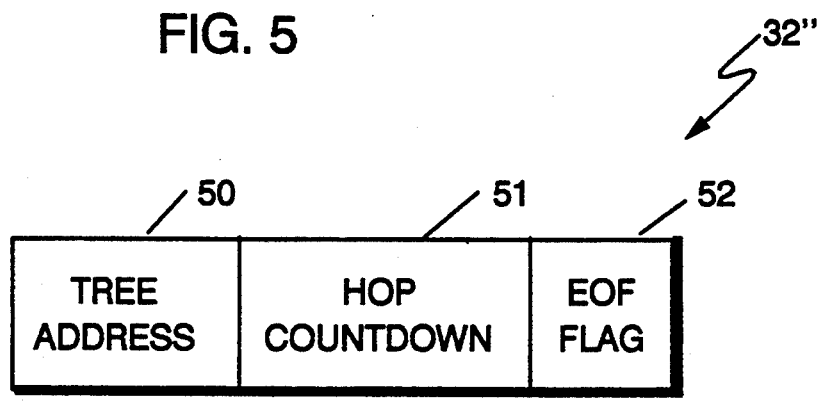
FIG. 5 shows a graphical representation of a Multicast Tree routing field in the header of FIG. 3.

In FIG. 4, a graphical representation of a typical Automatic Network Routing (ANR) field is shown comprising a plurality of link routing labels 40, 41, ...

, 42, followed by an end-of-field flag 43. The link labels 40–42 each identify one link in the communication path between the source of the packet and the destination of the packet, including all intranode links of all nodes which the packet traverses. The last label corresponds to the user application in the destination subnode. Moreover, these link labels are in exactly the same sequence as the sequence in which the links are to be traversed in reaching the destination. The next-to-last link label identifies the link to the destination subnode, to which the packet is to be delivered. A subnode, then, is a switching point requiring the use of one link label in order to forward the packet to the next subnode. Indeed, the link label is used to control the actual switching at the subnode. Note that links are bidirectional in that they provide transmission capacity in both directions between the interconnected nodes and subnodes. A separate link label is therefore provided for each direction of transmission.

As a packet flows through the packet network of FIG. 1, the ANR labels in field 40–42 of FIG. 4 are stripped away by the adapter circuits that receive the packet from the switching bus 23 of FIG. 2. The first label within the ANR routing field is therefore always the label for the link to be selected at the next subnode. Each subnode, therefore, need only consider the first label of the ANR field in selectively routing the packet from that subnode.

In FIG. 5, there is shown a graphical representation of the routing field used for the Tree Multicast Mode (TMM) routing. Multicasting means delivering the same packet to a plurality of different destination user applications from the same originating user application. The members of the group of different destinations which are to receive such common packet transmission are associated together in a multicast tree. The adapter circuits for each link in the tree are marked with the same tree address which is found in the tree address field 50 of the TMM field of FIG. 5.

An address of a multicast tree is set up at the same time that the multicast tree itself is created. Furthermore, a tree address is not modified or removed (as are the ANR labels in ANR routing) as the packet moves through the packet network of FIG. 1. At each subnode encountered by a packet with a multicast tree address, the packet is received, by the adapters (14–16, 20–22 or 24–26) for every outgoing link and user application sharing that tree address, except the link or user application from which it was passed to the bus. The duplicate packets are transmitted to all adjacent subnodes of the multicast tree where the duplication and retransmission are continued until no outgoing links share the multicast tree address. To prevent duplicate delivery of the same packet, a multicast tree is created without loops, permitting only one path between any two subnodes, even under network failure conditions. As shown in FIG. 5, a hop countdown field 51, which is decremented at each retransmission of the packet, is included in the TMM field. When the hop countdown field is equal to zero, packet retransmission stops. The TMM field of FIG. 5 is terminated by an end-of-field flag 52.

To send a packet to all other members of a multicast tree, an originating user application in the tree includes the TMM Identifying code in control byte 34 (FIG. 3) and, in the routing field, the appropriate tree address which identifies the group. All user applications which are members of the multicast tree will receive a copy of the packet. Any user application can simultaneously be a member of a plurality of different multicast trees, and hence, the tree addresses assigned to overlapping multicast trees must be unique. Subnodes can be added or deleted from a multicast tree simply by adding or removing the tree address from the links leading to the subnode to be added or deleted. This can be requested through network control messages sent from one node's CP to other nodes' CP's.

Figure 6:
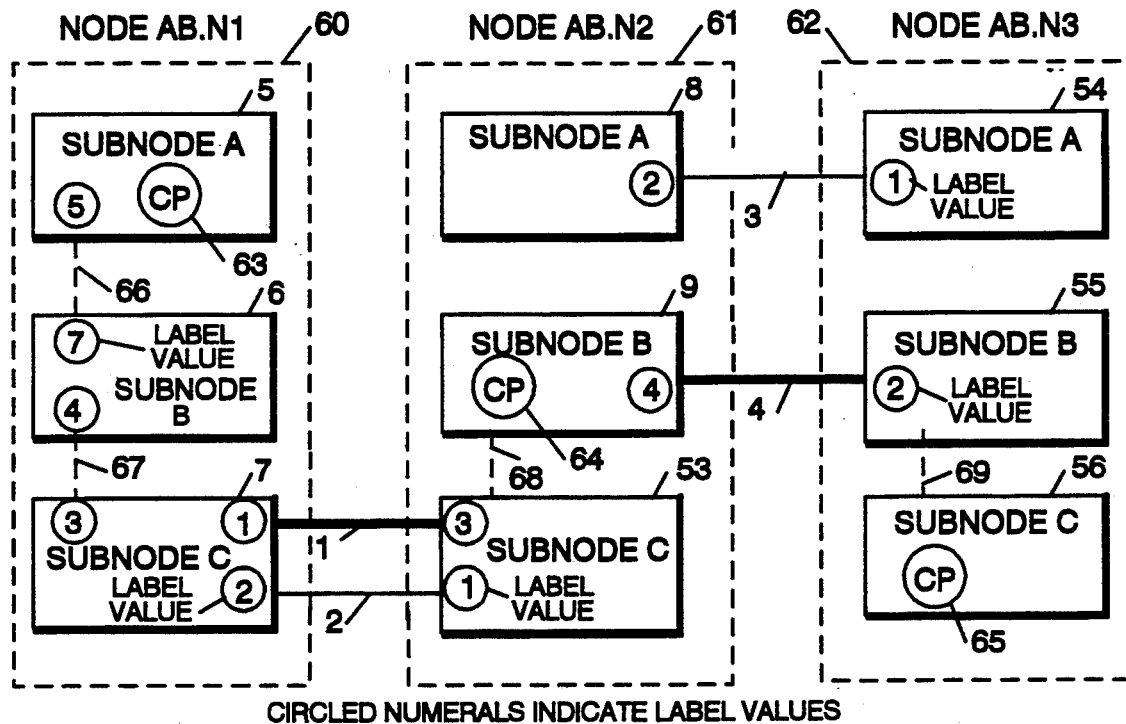
FIG. 6 is a block diagram of a packet communications system having three nodes, each node including subnodes according to this invention, and each node having all its control point functions contained in a single subnode.

FIG. 6 is a block diagram of a packet switching network (with NetID AB) composed of three nodes 60, 61 and 62, each of which encompasses three subnodes (5, 6, and 7 in node 60; 8, 9, and 53 in node 61; 54, 55, and 56 in node 62). Each node is identified in the topology database by a combination of network identifier and node identifier (AB.N1, AB.N2, and AB.N3 as shown). In this embodiment, each node in turn possesses a set of network control functions called its control point (CP) within one of its subnodes, e.g., subnode 5 in node 60 contains CP 63, subnode 9 in node 61 contains CP 64, and subnode 56 in node 62 contains CP 65. Each subnode has a unique identifier within the node (A for subnodes 5, 8, and 54; B for subnodes 6, 9, and 55; C for subnodes 7, 53, and 56). Shown in solid lines are internode transmission links 1 and 2 between subnodes 7 and 53, internode link 3 between subnodes 8 and 54, and internode link 4 between subnodes 9 and 55. The binary numbers in routing labels may be referred to by specifying the equivalent decimal values. Link 1 is programmed for a routing label value of 1 in subnode 7 and a label value of 3 in subnode 53. Likewise, link 2 has label values 2 and 1 in subnodes 7 and 53, respectively; link 3 has label values 2 and 1 in subnodes 8 and 54, respectively, and link 4 has label values 4 and 2 in subnodes 9 and 55, respectively. Internode links 1, 2, 3 and 4 are identified in the topology database by the subnodes they connect and their associated ANR routing labels in each subnode, e.g., AB.N1.C,1,AB.N2.C,3 for link 1. Selected intranode links are shown as dashed lines; these are links 66 (between subnodes 5 and 6 in node 60), 67 (between subnodes 6 and 7 in node 60), 68 (between subnodes 9 and 53 in node 61), and 69 (between subnodes 55 and 56 in node 62). Intranode links are also identified in the topology database by the subnodes they connect and their associated ANR routing labels in each subnode. For example intranode link 66, which has routing label values of 5 and 7 in subnodes 5 and 6 respectively, is identified by AB.N1.A,5-,AB.N1.B,7.

The spanning tree algorithm is enhanced to handle subnodes and intranode links. The spanning tree can still be represented as a graph composed of nodes and edges (internode links on the spanning tree). Edges are understood to run from a subnode in one node to a subnode in another node. As with the current art, when a link becomes part of the spanning tree, the nodes at both ends of the link program the link to accept packets with the architecturally-defined tree address and flag the link in the topology database as being part of the spanning tree.

Because a node now includes internal subnodes, the path from the control point (CP) in one node to the CP of an adjacent node may traverse intranode links and subnodes. Thus, the path from CP to CP may actually be a complex path through several subnodes (as is diagrammed in FIG. 6), rather than a single transmission link. Such a path can consist of several intranode links, an internode link, and several more intranode links, end to end. Each node programs a set of its intranode links with the tree address of the spanning tree such that the subnode containing the CP and the subnodes connected to internode spanning tree links are connected but no loops are formed. (It is not necessary to flag these intranode links in the topology database as part of the spanning tree.) Thus, the overall structure of subnodes, intranode links, and internode links is that of a tree, and TMM routing can still be used to efficiently route network control packets.

Returning to FIG. 6, links 1 and 4 are part of the spanning tree and are shown with bold lines. Only the intranode links programmed with tree address of the spanning tree are shown; other intranode links are not shown.

When a transmission link between two nodes is activated, the information exchanged is expanded to include a string of one or more ANR labels that represents the path through each of the two nodes from the subnode attached to the transmission link to its CP. The beginning zero or more labels of such a string specify the intranode links between subnodes and the final label is the ANR label for the CP. Each CP can utilize this string of labels to direct packets across the newly-activated link to its adjacent CP.

As a user application now resides in a subnode (i.e., in an adapter associated with a specific switching mechanism), the network address for a user application is expanded to identify this subnode. Thus, a network address of the form (NetID.node ID.subnode ID), routing label is provided by a query to the directory function. Likewise, the network address for a group of user applications connected with a multicast tree is of the form (NetID.node ID.subnode ID, tree address).

With the expanded information available in the topology and directory databases, the path selection function is able to provide point-to-point linear paths and multicast trees that include not only internode links but also intranode links. Thus, an ANR routing field would have routing labels for intranode links interleaved with the labels for internode links. The path selection function is not otherwise changed.

Figure 7:
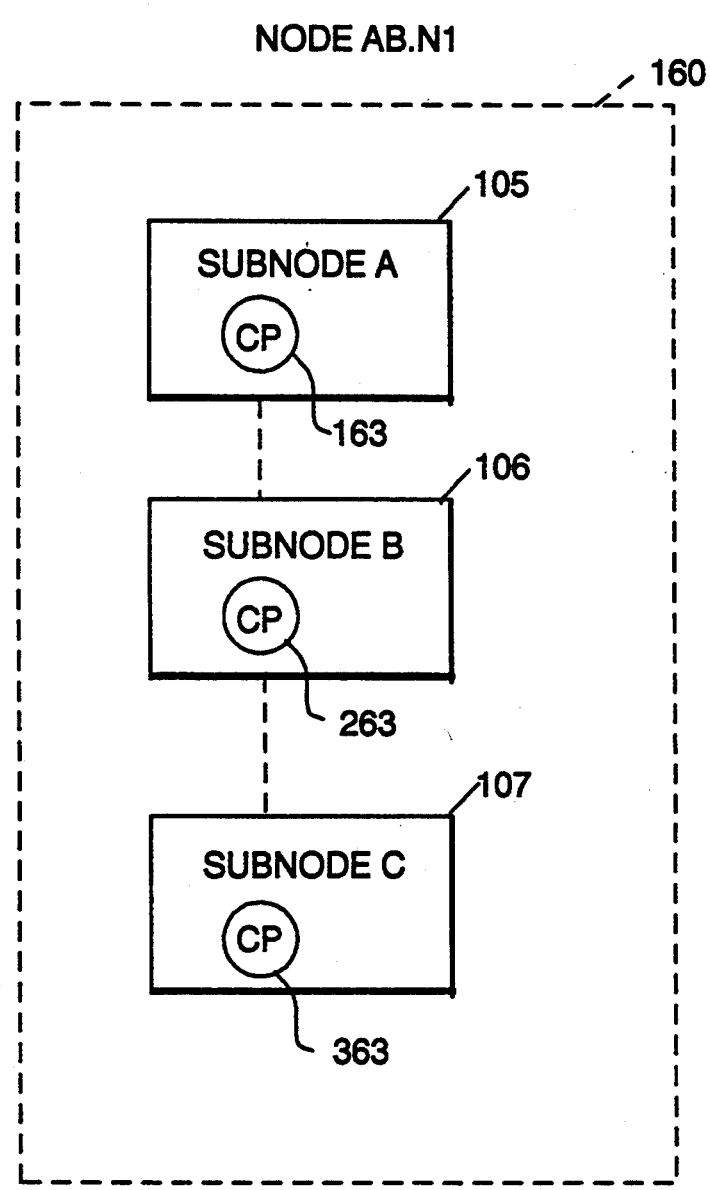
FIG. 7 is a block diagram of a single node of a packet communications system in which the control point functions are distributed among the subnodes within the node.

FIG. 7 shows node A of FIG. 6 in the case where the control point functions are distributed among the subnodes of the node. The node is designated 160. The subnodes are designated 105, 106, and 107. The subset of control point functions in subnode A is designated 163, in subnode B 263, in subnode C 363. The specific functions of the control point can be distributed in any way desired.

Figure 8:
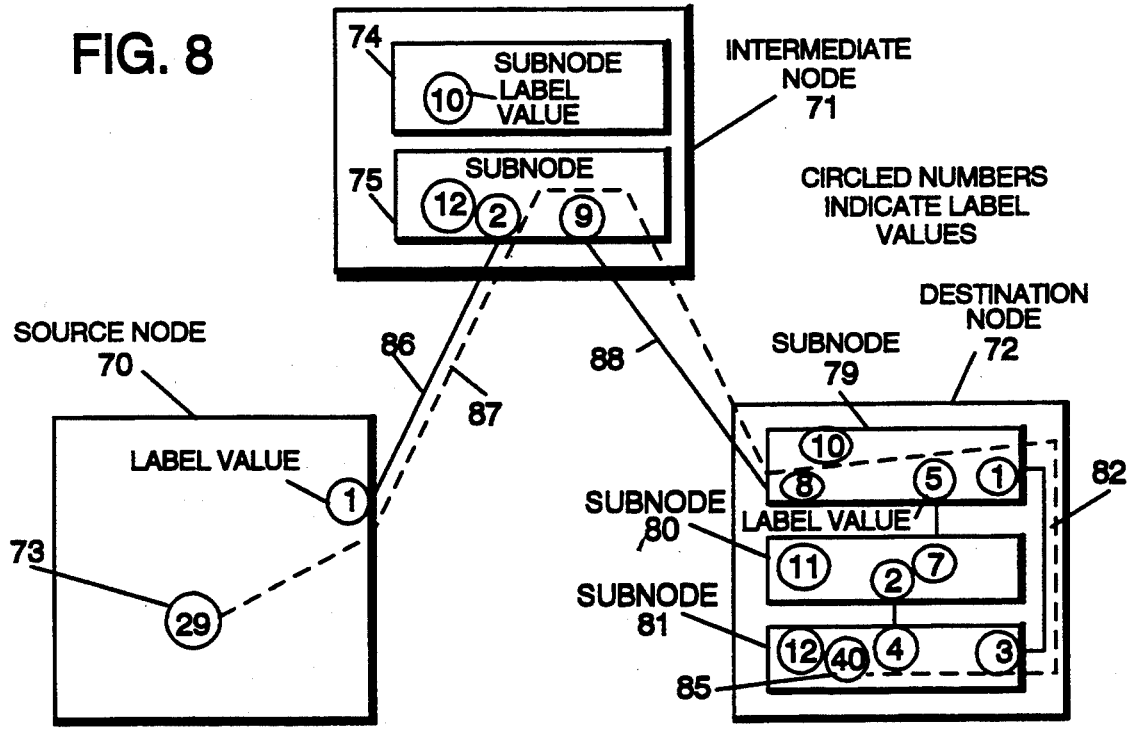
FIG. 8 is a block diagram of a packet communications system showing the routing, according to this invention, among three nodes, two of which contain subnodes.

FIG. 8 is a routing diagram for a three-node network comprising nodes 70, 71 and 72. Source node 70 contains a user application 73 for which a routing label value of 29 has been assigned and an internode link 86 assigned the label 1. Intermediate node 71 contains two subnodes 74 and 75 according to this invention. These subnodes have subnode IDs 10 and 12, respectively. Subnode 75 has internode links assigned the labels 2 and 9. Destination node 72 contains three subnodes 79, 80, and 81 identified with subnode IDs 10, 11, and 12, respectively. Subnode 79 has an internode link assigned the label 8 and intranode links assigned the labels 1 and 5. Subnode 80 is shown with intranode links assigned the labels 2 and 7. Subnode 81 has intranode links assigned the labels 3 and 4 and an user application 85 assigned the label 40. Each link is shown with a solid line.

It is desired to send a message from the user application 73 in source node 70 to the user application 85 in destination node 72. Dashed line 87 indicates the desired overall path between nodes 70 and 72 by way of intermediate node 71. Thus, the path is composed of two internode links 86 and 88 and one intranode link 82.

The complete routing field of an outgoing message from user application 73 in node 70 has the ANR routing labels 1,9,1,40. These numbers are the labels of the outgoing links of the subnodes to be traversed by the message plus the endpoint label in the destination node. At node 70, according to the usual practice, the label for link 86 is stripped out of the routing field, and the routing field is reduced to 9,1,40. At node 71, the label for link 88 is stripped out, and the routing field is reduced to 1,40. At subnode 79 in node 72 the label for link 82 is removed thus reducing the routing field to 40. Thus, the message can be passed to user application 85 in subnode 81.

If reverse path accumulation is in effect to enable the destination user application to send a reply to the message, a reverse routing field bearing the reverse link labels of the several communication links and the label for application 73 (3,8,2,29) is built as the packet flows through the subnodes in the forward direction.

The following Table 1 summarizes the foregoing discussion. The principle of this table can readily be extended to any length path. The routing clearly exploits the internal contents of nodes divided into subnodes according to this invention.

TABLE 1

| Routing Field with Intranode Links | | |
|---|---|---|
| Forward Routing Field | Reverse Routing Field | Network Location |
| 1,9,1,40 | 29 | Within Node 70 |
| 9,1,40 | 29 | On Link 86 |
| 9,1,40 | 2,29 | Within subnode 75 of Node 71 |
| 1,40 | 2,29 | On Link 88 |
| 1,40 | 8,2,29 | Within subnode 79 of Node 72 |
| 40 | 8,2,29 | On Intranode Link 82 of Node 72 |
| 40 | 3,8,2,29 | Within Subnode 81 of Node 72 |

With intranode links included in the paths provided by the path selection function, the bandwidth management and reservation function is able to allocate, maintain, and deallocate bandwidth on intranode links concurrently and in the same manner as bandwidth on internode links. Likewise, intranode link capacity and allocation information can be taken into account in the setting of parameters for the congestion control mechanism in the same manner as internode link information is handled currently. Bandwidth management and reservation and congestion control are not otherwise changed.

While this invention has been particularly shown and described with reference to a specific embodiment and example, it will be understood by those skilled in the art that various changes in form and detail may be made without departing from the spirit and scope of the invention.

Having thus described our invention, what we claim as new and desire to secure by Letters Patent is:

1. A method, in a node in a packet switched communications network having two or more nodes and having one or more nodes containing subnodes, for creating a spanning tree which includes one or more intranode links, said method comprising the steps of:

determining, for each node having subnodes, which subnodes have external links that are to be part of said spanning tree;

determining, for each node having subnodes, the subnode within which a control point resides;

selecting in each node having subnodes, a set of intranode links to provide a connection path between the subnode in which the control point resides and the subnodes having external links;

programming said set of intranode links with a tree address, so that said set of intranode links is included in said spanning tree.

2. A method, in a receiving node, the receiving node having a control point and being part of a packet switched network, for sending an expanded information packet to a sending node during link activation, said method comprising the steps of:

creating a packet having a routing field and having a message field containing two or more automatic network routing (ANR) labels;

setting a final ANR label for said two or more ANR labels in said message field to specify the control point within said receiving node;

setting non-final ANR labels for the remaining ANR labels of said two or more ANR labels within said message field to specify intranode links between the subnodes of said receiving node; and sending said expanded information packet to said sending node in order to communicate to said sending node an optimum intranode path to the control point of said receiving node.

3. Apparatus, in a receiving node, the receiving node having a control point and being part of a packet switched network, for sending an expanded information packet to a sending node during link activation, said apparatus comprising:

means for creating a packet having a routing field and having a message field containing two or more automatic network routing (ANR) labels;

means for setting a final ANR label for said two or more ANR labels in said message field to specify the control point within said receiving node;

means for setting non-final ANR labels for the remaining ANR labels of said two or more ANR labels within said message field to specify intranode links between the subnodes of said receiving node; and means for sending said expanded information packet to said sending node in order to communicate to said sending node an optimum intranode path to the control point of said receiving node.

* * * * *